Oct. 1, 1963 H. J. HEIJN 3,105,897
BINARY PARALLEL ADDER UTILIZING SEQUENTIAL AND SIMULTANEOUS CARRY GENERATION
Filed Feb. 10, 1959 4 Sheets-Sheet 1

INVENTOR
HERMAN JACOB HEIJN
BY
[signature]
AGENT

INVENTOR.
BY HERMAN J. HEIJN
Frank R. Jeffrey
AGENT

INVENTOR.
HERMAN J. HEIJN
BY
Frank R. Jifani
AGENT

INVENTOR
HERMAN JACOB HEIJN
BY
Frank R. Jeifari
AGENT

United States Patent Office 3,105,897
Patented Oct. 1, 1963

3,105,897

BINARY PARALLEL ADDER UTILIZING SEQUENTIAL AND SIMULTANEOUS CARRY GENERATION

Herman Jacob Heijn, Eindhoven, Netherlands, assignor to North American Philips Company, Inc., New York, N.Y., a corporation of Delaware Filed Feb. 10, 1959, Ser. No. 792,351
2 Claims. (Cl. 235—175)

This invention relates to an improvement in or a modification of the invention described and claim in United States patent application No. 708,917, filed January 14, 1958, now Patent No. 3,056,551, wherein there is disclosed an arithmetic unit for a digital computer built up of gates, which receives information about the digits of a plurality of numbers called operands and converts this information into information about the digits of the result of an arithmetical operation performed on the operands. The arithmetic unit is subdivided into a plurality of sections, each of which corresponds to a single digit place or a plurality of consecutive digit places of the operands and of the result, the carry being formed sequentially within these sections; each section, with the possible exception of the first, is provided with an input carry producer which produces the carry of the section concerned, which input carry producer receives information about the individual digits of the operands at all digit places of the immediately preceding section and, with the possible exception of the first, also receives information about the input carry of the section preceding the immediately preceding section; the latter input carry is produced in turn by the immediately preceding input carry producer, so that the production of the input carries is effected simultaneously so far as the digits at the digit places of the immediately preceding section are concerned but sequentially so far as the digits at the digit places are concerned with correspond to the sections preceding this immediately preceding section. The arrangement is such that the information about the digits of the result which correspond to the ends of the sections are all produced through about the same maximum number of gates in series so that the entire information about these digits of the result is produced substantially simultaneously. When performing some conditional operations, for example subtractions in division, it is of importance that the sign of the result of the operation being performed be available very rapidly since the nature of the next operation may depend on this sign. The sign of the result is determined by the last digit (the digit at the extreme left) of the result and consequently also by the carry produced from all the preceding digits. Hence, it is of importance for this carry (hereinafter to be referred to as end carry) to be available as rapidly as possible. However, in the arithmetic unit described in Patent No. 3,056,551 the end carry may be produced through all the input carry producers, and this takes an appreciable amount of time. It is an object of the present invention to obviate this disadvantage. An arithmetic unit in accordance with the invention includes an end carry producer which receives information about the digits at all digit places preceding the last place and from this information produces the end carry simultaneously. In the following description, the terms "digit place" and "order" are interchangeable.

In order that the invention may readily be carried out, embodiments of an arithmetic unit for a digital computer will now be explained more fully, by way of example, with reference to the accompanying drawings, in which.

Figure 4A:
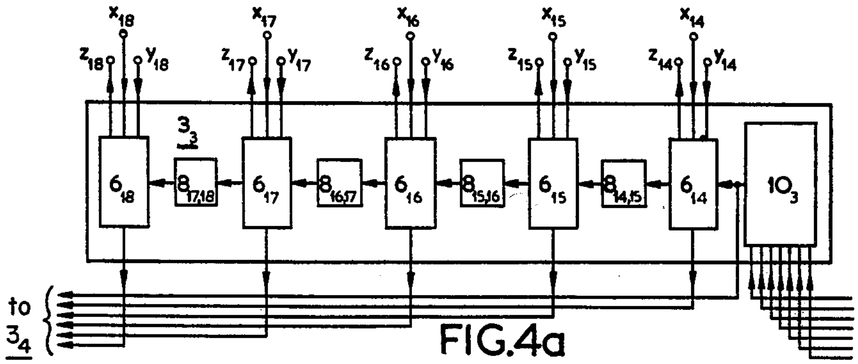
Figure 4B:
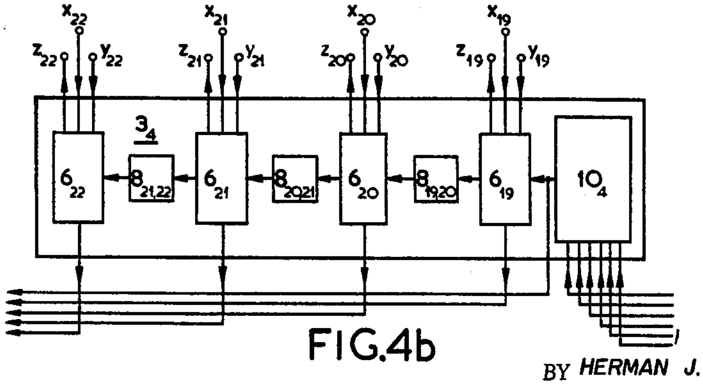
Figure 5:
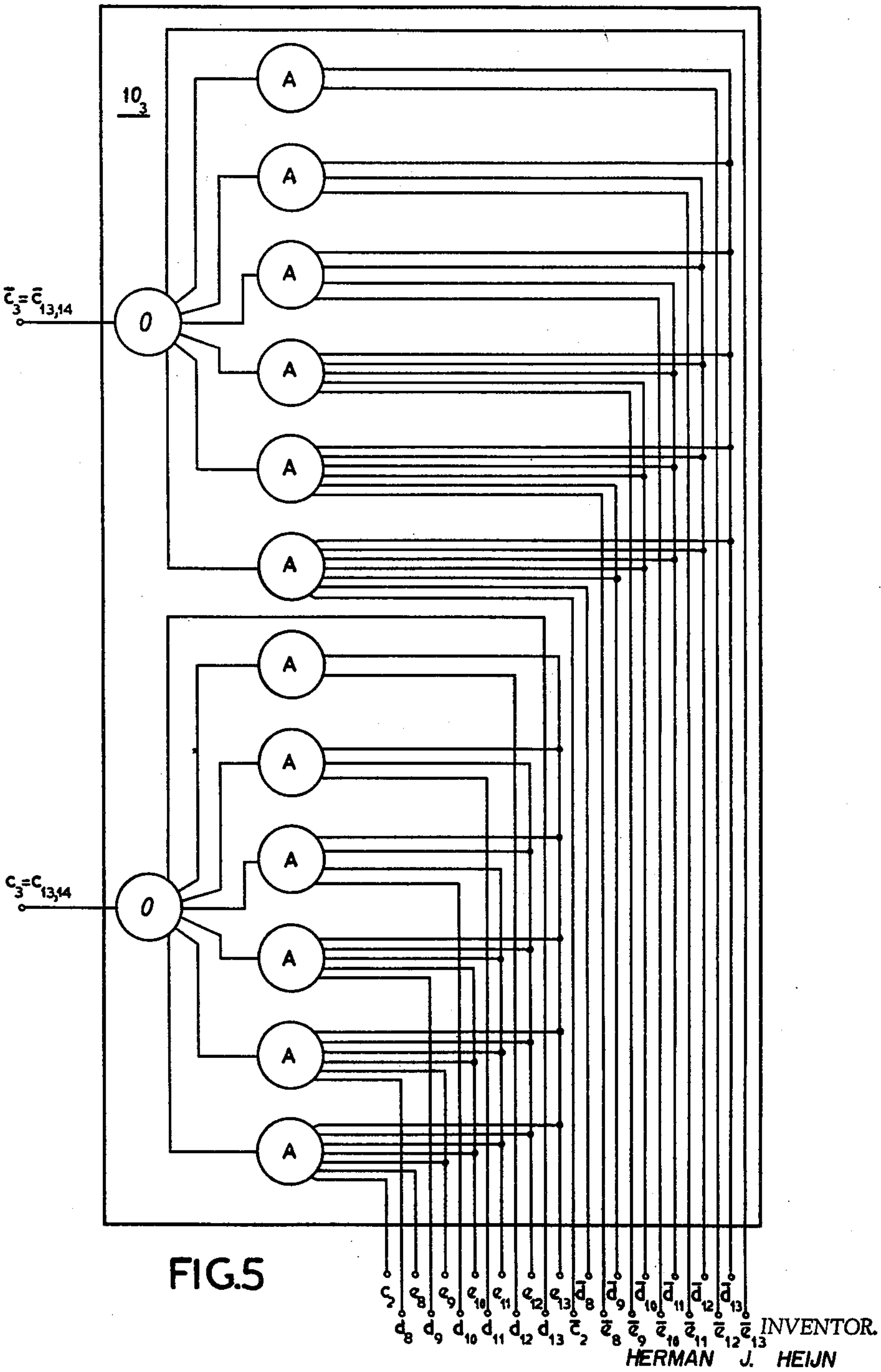
Figure 6:
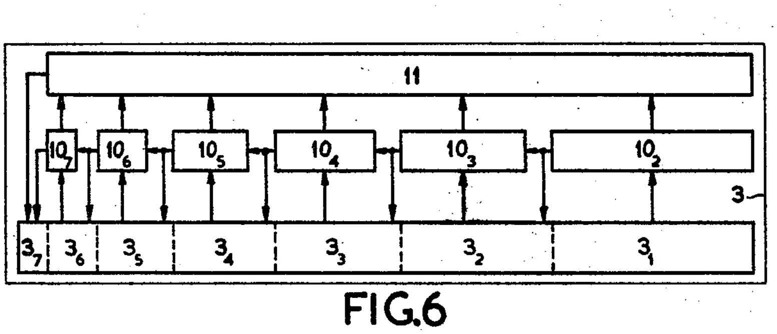
Figure 7:
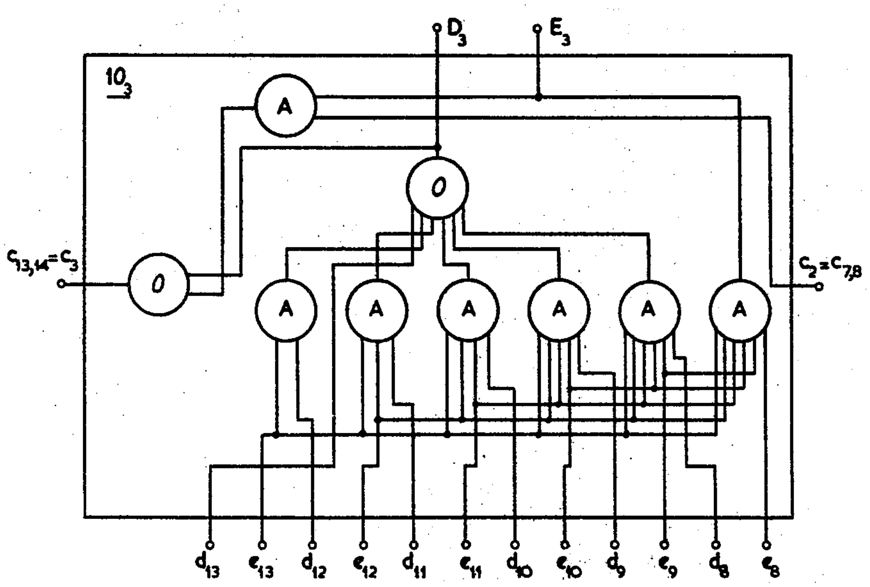
Figure 8:
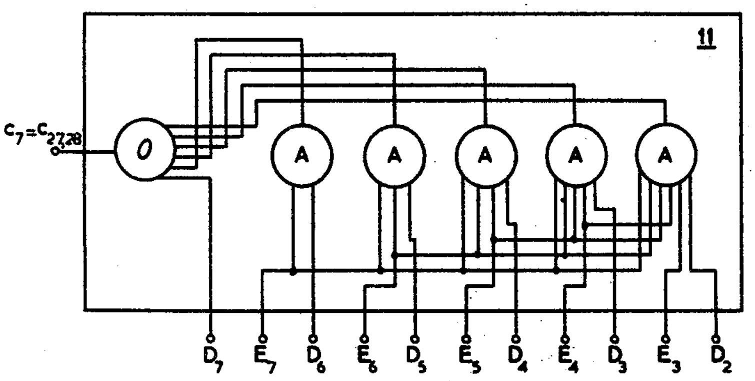

FIG. 4, composed of FIGS. 4*a* and 4*b*, shows a diagram of the third and fourth sections of a summation device such as shown in United States patent application No. 708,917;

FIG. 5 shows the diagram of one embodiment of the input carry producer of the third section of a summation device in accordance with the said patent application No. 708,917;

FIG. 6 shows the diagram of one embodiment of a summation device according to the instant application;

FIG. 7 shows the diagram of one embodiment of the input carry producer of the third section of the summation device shown in FIG. 6; and FIG. 8 shows the circuit diagram of one embodiment of the end carry producer of the summation device shown in FIG. 6.

Figure 1:
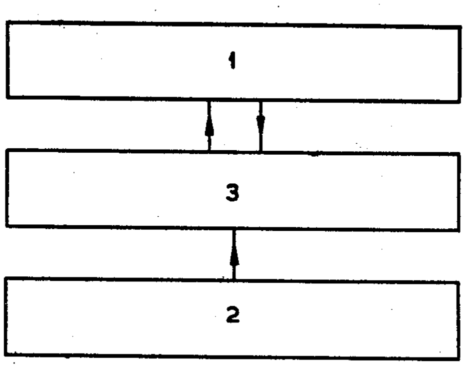
FIG. 1 shows the general principle of an arithmetic unit of a digital computer.

In FIG. 1, reference numerals 1 and 2 denote two registers in which numbers $x$ and $y$ can be stored, and reference numeral 3 denotes an arithmetic unit. The latter receives information from the registers 1 and 2 and produces the result $z$ of the arithmetical operation performed on the numbers or operands $x$ and $y$. This is shown in the figure by lines including arrows drawn from the registers to the arithmetic unit. From the instant at which the information about the result $z$ is completely present in the arithmetic unit, the result can be transferred to a member, for example the register 1, of the computer. This transfer of the number present in the arithmetic unit is effected by the action of a control pulse, which is supplied with a constant repetition period T by a pulse generator associated with the computer. This repetition period T must exceed the greatest time interval required by the arithmetic unit for producing the result. The lower limit thus set to the repetition period frequently lies, for computers having many digit places, considerably above the lower limit of the period by which the digits in the registers 1 and 2 can be varies, so that the computing rate of the computer can be increased by increasing the computing rate of the arithmetic unit.

Figure 2:
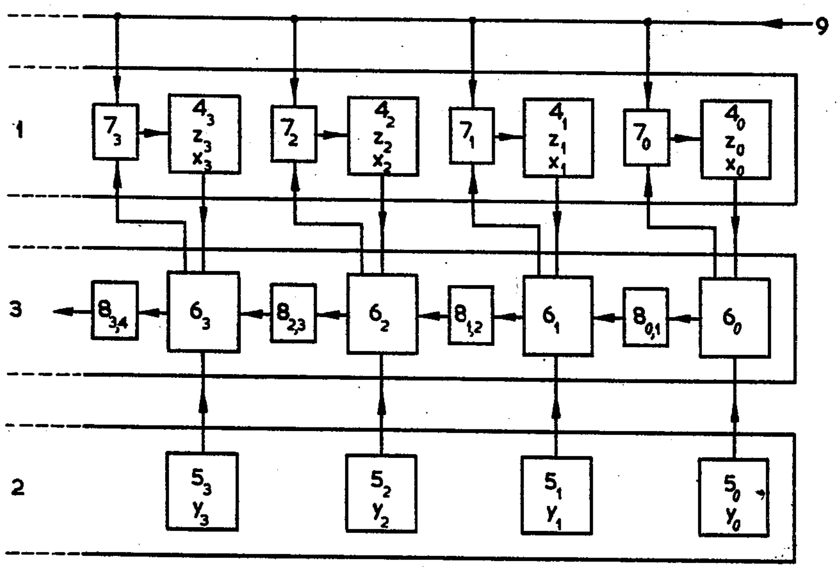
FIG. 2 shows a more detailed diagram of the arithmetic unit of known digital computers.

FIG. 2 shows in greater detail an arithmetic unit for performing additions in the binary scale of notation. The registers 1 and 2 comprise bistable members $4_0$, $4_1$, $4_2$ . . . , $5_0$, $5_1$, $5_2$ . . . which correspond to the digit places of the operands $x$ and $y$. Each stable condition of the members $4_i$, $5_i$ corresponds to a digit (0 and 1 in the binary scale of notation) at a given digit place. The arithmetic unit 3, in the present case the sum producer, comprises a plurality of adders $6_0$, $6_1$, $6_2$ . . . with interposed carry producers $8_{0,1}$, $8_{1,2}$, $8_{2,3}$, . . . . Finally the register 1 comprises a plurality of control members $7_0$, $7_1$, $7_2$ . . . Each adder $6_i$ receives information from the bistable members $4_i$ and $5_i$ at the same digit place and from the preceding carry producer $8_{i-1,i}$ (with the exception of the first adder $6_0$, if this is not preceded by a carry producer, as is the case in calculations using a so-called end-around-carry). Each adder $6_i$ supplies information to the control member $7_i$ at the same digit place and to the subsequent carry producer $8_{i,i-1}$ (with the exception of the last adder $6_n$, if this is not followed by a carry producer, as is the case in calculations using a so-called end-around-carry). Thus, a group of members $4_i$, $5_i$, $6_i$, $7_i$ corresponds to each digit place: $4_0$, $5_0$, $6_0$, $7_0$ correspond to the units or $2^0$-order digits, i.e., to the digit position 0; $4_1$, $5_1$, $6_1$, $7_1$ correspond to the $2^1$-order digits, i.e., to the digit position 1; $4_2$, $5_2$, $6_2$, $7_2$ correspond to the $2^2$-order digits, i.e., to the digit position 2; etc.

Each carry producer $8_{i-1,i}$ receives information (in FIG. 2 through the preceding adder $6_{i-1}$) from the preceding bistable members $4_{i-1}$, $5_{i-1}$ and from the preceding carry producer $8_{i-2,i-1}$ (except the first carry producer $8_{0,1}$, which is not preceded by a carry producer). Each carry producer supplies information to the succeeding adder $6_i$ and (in FIG. 2 through this adder $6_i$) to the succeeding carry producer (with the exception of the last carry producer $8_{n-1,n}$, which is not succeeded by a carry producer). As will be described more fully hereinafter, the adders and carry producers may also receive indirect information about the digits $x_i$ and $y_i$ of the numbers $x$ and $y$.

The digital arithmetic unit shown in FIG. 2 operates as follows. The two numbers to be added to each other $\ldots x_2x_1x_0$ and $\ldots y_2y_1y_0$ (in binary notation the numbers $x=x_0+2x_1+2^2x_2+\ldots$ and $$y=y_0+2y_1+2^2y_2+\ldots$$

where $x_i$ and $y_i$ can only assume the values 0 and 1) are stored in the registers 1 and 2 in a manner which is immaterial to the operation of the arithmetic unit, i.e. the member $4_i$ is brought into the condition corresponding to the digit $x_i$ and the member $5_i$ into the condition corresponding to the digit $y_i$. Information about the conditions of the members $4_0, 4_1, 4_2 \ldots, 5_0, 5_1, 5_2 \ldots$ is fed to the adders $6_0, 6_1, 6_2 \ldots$, for example in the form of voltages. Now in the adder $6_0$ information is produced about the first digit $z_0$ of the sum $z$ and in the carry producer $8_{0,1}$ information is produced about the carry $c_{0,1}$ resulting from this addition. Subsequently in the adder $6_1$ information is produced about the second digit $z_1$ of the sum $z$ and in the carry producer $8_{1,2}$ information is produced about the carry $c_{1,2}$ resulting from this addition. Then in the adder $6_2$ information is produced about the third digit $z_2$ of the sum $z$ and in the carry producer $8_{2,3}$ information is produced about the carry $c_{2,3}$ resulting from this addition. This process continues in an analogous manner until information about all digits $z_0, z_1, z_2 \ldots$ of the sum $z=x+y$ is available. Subsequently a control pulse is applied, through a conductor 9, to all control members $7_0, 7_1, 7_2 \ldots$ with the result that the information available about the digits $z_0, z_1, z_2 \ldots$ is transferred to the members $4_0, 4_1, 4_2 \ldots$ which consequently assume the conditions corresponding to these digits. If desired, the computer may comprise control members causing the sum $z$ to be transferred to a member other than the register 1, for example to a main storage or auxiliary storage. From the foregoing it is apparent that the addition performed by this summation device is effectively a sequential operation, that is to say, takes place digit after digit. This is true even though the digits of the two numbers to be added are simultaneously supplied to the arithmetic unit for, in the most unfavorable case, the carry ripples over all the digit positions. Storing a number in a register can, but need not, be effected as a simultaneous operation, that is to say, all the digits can be stored in the register simultaneously. Assuming now that:

$T_1$=minimum time interval, in which the members $4_i$, $5_i$ can be made to pass completely from one stable condition to another stable condition;

$T_2$=minimum time interval in which the members $4_i$, $5_i$, after the occurrence of a control pulse, can supply information about the new stable condition;

$T_3$=minimum time interval in which each of the logical members $6_i$, $8_{i-1,i}$ can supply output information after the reception of input information. If the arithmetic unit has $n$ digit places, it is necessary that $$T \geqq \max.\ (T_1,\ T_2+nT_3) \qquad (1)$$

where $n$ is the number of digit places of the sum producer. This does not mean that each sum appears in the sum producer 3 only a time interval $T_2+nT_3$ after the occurrence of a control pulse, for each adder and carry producer becomes operative immediately upon receipt of information, that is to say the adders and carry producers operate simultaneously if the digits of the numbers $x$ and $y$ are stored in the registers 1 and 2 simultaneously. The output information of the adder $6_1$ and of the carry producer $8_{1,2}$ may still vary if at the instant $T_3$ information about the carry $c_{0,1}$ is received, the instant 0 being the instant at which the information about all the digits which are simultaneously stored in the registers 1 and 2 is available. The output information of the adder $6_2$ and of the carry producer $8_{2,3}$ may still vary if the information received about the carry $c_{1,2}$ received from the preceding carry producer $8_{1,2}$ is still varying at the instant $2T_2$, and so on. In the most unfavourable cases (for example the addition $\ldots 1111+\ldots 0001$), the sum only appears in the summation device a time interval $nT_3$ after information about digits $x_0, x_1, x_2 \ldots y_0, y_1, y_2 \ldots$ has become available simultaneously. Hence, for high values of $n$ the computing speed of the summation device is limited by the condition $T \geqq T_2+nT_3$. This is a disadvantage as will be apparent from the fact that this time interval is required infrequently only. Considered statistically, arbitrary additions of numbers written in the binary notation comprising forty digits require an average time interval of $4.6T_3$ for producing the sum of two numbers $x$ and $y$ in the summation device, so that a considerable decrease in computing rate is necessary for additions which occur only rarely.

Figure 3:
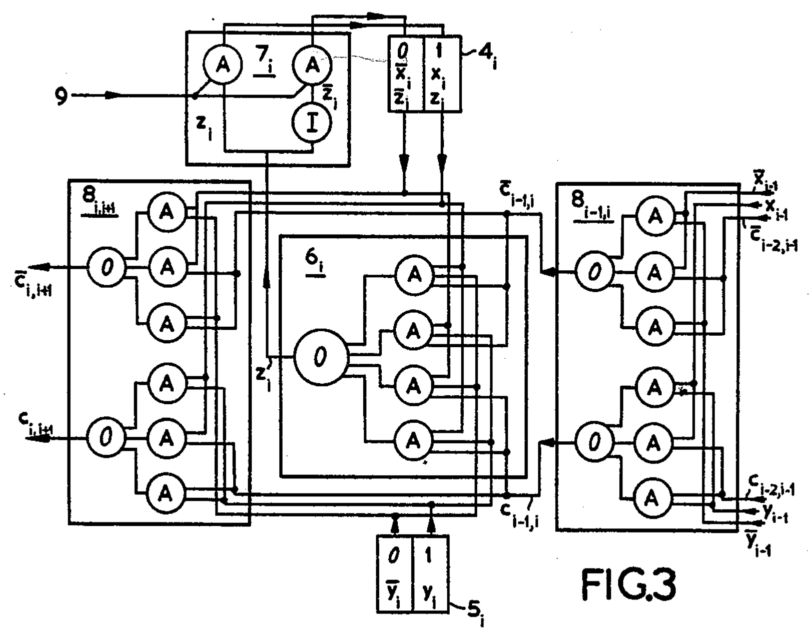
FIG. 3 shows a diagram of some details of the arithmetic unit shown in FIG. 2.

FIG. 3 shows a possible embodiment of the members $4_i$, $5_i$, $6_i$, $7_i$, $8_{i-1,i}$. The members $6_i$ realize the Boolean expression:

$$z_i = x_i\bar{y}_i\bar{c}_{i-1,i} + \bar{x}_i y_i\bar{c}_{i-1,i} + \bar{x}_i\bar{y}_i c_{i-1,i} + x_i y_i c_{i-1,i} \qquad (2)$$

and the members $8_{i-1,i}$ realize the two Boolean expressions:

$$c_{i-1,i} = x_{i-1}y_{i-1} + x_{i-1}c_{i-2,i-1} + y_{i-1}c_{i-2,i-1} \qquad (3)$$

$$\bar{c}_{i-1,i} = \bar{x}_{i-1}\bar{y}_{i-1} + \bar{x}_{i-1}\bar{c}_{i-2,i-1} + \bar{y}_{i-1}\bar{c}_{i-2,i-1} \qquad (4)$$

In the above formulae the logical "or" function is symbolized as an addition ($x+y$ signifies "$x$ or $y$"), the logical "and" function is symbolized as a multiplication ($xy$ signifies "$x$ and $y$"), the logical negation is symbolized by a bar over a character ($\bar{x}$ signifies "not $x$"). The notation $x_i$ indicates that the $i^{th}$ digit of the number $x$ is equal to 1 and $\bar{x}_i$ indicates that this digit is equal to 0. One arrives at the Formula 2 by observing that $z_i=1$, if either only one of the three quantities $x_i$, $y_i$, $c_{i-1,i}$ has the value 1, or all three quantities have the value 1. The Formula 3 expresses that $c_{i-1,i}=1$ if at least two of the three quantities $x_{i-1}$, $y_{i-1}$ and $c_{i-2,i-1}$ have the value 1 and the Formula 4 expresses that $c_{i-1,i}=0$ if at least two of the three quantities have the value 0.

The members $6_i$, $8_{i-1,i}$ may be built up from and-gates A, or-gates O and, if desired, inverting gates I. FIG. 3 shows the structure of these members which is based directly upon the Expressions 2, 3, 4. Since each Boolean function may be expressed in its variables in an infinite number of equivalent manners, many further embodiments of the members $6_i$ and $8_{i-1,i}$ are possible. This remark applies of course to any logical member.

The member $7_i$ may be built up in the manner described from two and-gates A and an inverting gate I. The inverting gate may be omitted if the member $6_i$ produces not only the information $z_i$ but also the information $$\bar{z}_i = \bar{x}_i y_i c_{i-1} + x_i\bar{y}_i c_{i-1,i} + x_i y_i\bar{c}_{i-1,i} + \bar{x}_i\bar{y}_i\bar{c}_{i-1,i} \qquad (5)$$

in the same way as the carry producer $8_{i-1,i}$ produces not only the information $c_{i-1,i}$ but also the information $\bar{c}_{i-1,i}$.

When writing the Formulas 3, 4 for $i=0, 1, 2, 3 \ldots$ successively and assuming $c_{-1,0}=0$, $\bar{c}_{-1,0}=1$, we have $$\left.\begin{aligned} c_{0,1} &= x_0y_0 \\ c_{1,2} &= x_1y_1+(x_1+y_1)c_{0,1} \\ c_{2,3} &= x_2y_2+(x_2+y_2)c_{1,2} \end{aligned}\right\} \qquad (6)$$

$$\left.\begin{aligned}\bar{c}_{0,1}&=\bar{x}_0+\bar{y}_0\\ \bar{c}_{1,2}&=\bar{x}_1\bar{y}_1+(\bar{x}_1+\bar{y}_1)\bar{c}_{0,1}\\ \bar{c}_{2,3}&=\bar{x}_2\bar{y}_2+(\bar{x}_2+\bar{y}_2)\bar{c}_{1,2}\end{aligned}\right\}\quad(7)$$

and from this it follows that $$\begin{aligned}c_{i-1,i}=&x_{i-1}y_{i-1}+(x_{i-1}+y_{i-1})x_{i-2}y_{i-2}\\ &+(x_{i-1}+y_{i-1})(x_{i-2}+y_{i-2})\ \ldots\ x_{i-3}y_{i-3}\\ &+(x_{i-1}+y_{i-1})(x_{i-2}+y_{i-2})\ \ldots\ (x_1+y_1)x_0y_0\end{aligned}\quad(8)$$

$$\begin{aligned}\bar{c}_{i-1,i}=&\bar{x}_{i-1}\bar{y}_{i-1}+(\bar{x}_{i-1}+\bar{y}_{i-1})\bar{x}_{i-2}\bar{y}_{i-2}+(\bar{x}_{i-1}+\bar{y}_{i-1})\\ &(\bar{x}_{i-2}+\bar{y}_{i-2})\ \ldots\ \bar{x}_{i-3}\bar{y}_{i-3}+(\bar{x}_{i-1}+\bar{y}_{i-1})\\ &(\bar{x}_{i-2}+\bar{y}_{i-2})\ \ldots\ (\bar{x}_1+\bar{y}_1)\ \ldots\ (\bar{x}_0+\bar{y}_0)\end{aligned}\quad(9)$$

which formulas can be proved by induction. From the Formulas 2 and 8 it follows successively $$\left.\begin{aligned}z_0=&(x_0\bar{y}_0+\bar{x}_0y_0)\\ z_1=&(x_0y_0x_1y_1)+(x_0y_0\bar{x}_1\bar{y}_1)+(\bar{x}_0x_1\bar{y}_1+\bar{x}_0\bar{x}_1y_1\\ &+\bar{y}_0x_1\bar{y}_1+\bar{y}_0\bar{x}_1y_1)\\ z_2=&(x_1y_1x_2y_2)+(x_1y_1\bar{x}_2\bar{y}_2)+(\bar{x}_1\bar{y}_1x_2\bar{y}_2+\bar{x}_1\bar{y}_1\bar{x}_2y_2)\\ &+(x_0y_0x_1x_2y_2+x_0y_0y_1x_2y_2)+(x_0y_0x_1\bar{x}_2\bar{y}_2\\ &+x_0y_0y_1\bar{x}_2\bar{y}_2)+(\bar{x}_0\bar{x}_1y_2\bar{y}_2+\bar{x}_0\bar{x}_1\bar{x}_2y_2\\ &+\bar{x}_0\bar{y}_1x_2\bar{y}_2+\bar{x}_0\bar{y}_1\bar{x}_2y_2\\ &+\bar{y}_0\bar{x}_1x_2\bar{y}_2+\bar{y}_0\bar{x}_1\bar{x}_2y_2+\bar{y}_0\bar{y}_1x_2\bar{y}_2+\bar{y}_0\bar{y}_1\bar{x}_2y_2)\end{aligned}\right\}\quad(10)$$

. . . . . . . . . . . . . . . .

In these formulas, $x_i$ and $y_i$ may be interchanged for any value of $i$ occurring therein. The terms resulting from such interchanges are enclosed in brackets. On the basis of the Formulas 10 and analogous formulas which can be developed for $\bar{z}_0$, $\bar{z}_1$, $\bar{z}_2$ . . . it is possible to design a sum producer without carry producers, in which each digit $z_i$ is produced through two gates in series. This is the fastest sum producer that can be built with gates, but this solution requires a huge number of gates and hence of valves, crystal diodes or relays.

Another sum producer which is a little less fast though still extremely fast, is obtained by producing the informations $z_i$ and $\bar{z}_i$ via the informations $c_{i-1,i}$ and $\bar{c}_{i-1,i}$ and producing the latter informations again via the informations $$d_i=x_iy_i,\ e_i=x_i+y_i,\ \bar{d}_i=\bar{x}_i+\bar{y}_i,\ \bar{e}=\bar{x}_i\bar{y}_i\quad(11)$$

For this purpose the Formulas 2, 5, 8 and 9 are written in the form $$z_i=e_i\bar{d}_i\bar{c}_{i-1,i}+\bar{e}_ic_{i-1,i}+d_ic_{i-1,i}\quad(12)$$

$$\bar{z}_i=e_i\bar{d}_ic_{i-1,i}+\bar{e}_i\bar{c}_{i-1,i}+d_i\bar{c}_{i-1,i}\quad(13)$$

$$\begin{aligned}c_{i-1,i}=&d_{i-1}+e_{i-1}d_{i-2}+e_{i-1}e_{i-2}d_{i-3}\\ &+\ \ldots\ e_{i-1}e_{i-2}\ \ldots\ e_1d_0\end{aligned}\quad(14)$$

$$\begin{aligned}c_{i-1,i}=&e_{i-1}+d_{i-1}e_{i-2}+d_{i-1}d_{i-2}e_{i-3}\\ &+\ \ldots\ d_{i-1}d_{i-2}\ \ldots\ d_1d_0\end{aligned}\quad(15)$$

On the basis of these formulas a summation device can be built which supplies all digits of the sum via at most three gates in series and consequently operates extremely fast; however the construction of this device also requires a huge number of gates and hence of tubes, crystal diodes, relays and so on. Assuming, for example, that each gate can supply its output information 20$n$ seconds (=20.10$^{-9}$ seconds) after receipt of its input information, a summation device designed in accordance with these formulas can calculate, for any number of digit places, the sum of two binary numbers in 3.20$n$ seconds =60$n$ seconds.

As has been mentioned hereinbefore, this extremely high computing speed frequently cannot be completely utilised for reasons extraneous to the summation device. The summation device may then be subdivided advantageously into sections each corresponding to more than one digit place and each section may be designed in the manner shown in FIG. 2, while allowance must be made for the fact that a carry must in certain cases traverse all digit places of a section. Three courses can be adopted, namely:

A. Each section is provided with an input carry producer in which the carry traverses a small number of stages (three or two) and receives direct or indirect information about all digits $x_i$ and $y_i$ preceding this section. These inputs carry producers can produce the informations $c_{i-1,i}$ and $\bar{c}_{i-1,i}$ by means of logical circuits based on the Formulas 14 and 15. All sections may then correspond to an equal number of digit places, with the exception of the first which, if no end-around-carry is produced, may comprise a few digit places more due to the absence of an input carry producer. In this event, the input carry producers operate simultaneously. The high carry producers (that is to say, carry producers $8_{i-1,i}$ for high values of $i$), however, become very complicated in this solution and hence the following method B is preferred.

B. Each section is provided with an input carry producer in which the carry traverses two or three stages and receives as input information direct or indirect information about the digits $x_i$ and $y_i$ of the section preceding this section and the output information of the preceding input carry producer. In this case, each section must have a few digit places less than the preceding section, since the input carry producers now operate in series and a carry may traverse all input carry producers.

C. The methods A and B can be combined.

FIGS. 4*a* and 4*b* show diagrammatically the structure on the third and fourth sections of a summation device of the type B, the sections of which, taken from the first or extreme right to the last or extreme left, correspond successively to 8, 6, 5, 4, 3, 2, 1, digit places. Thus, the third and fourth sections correspond to 5 and 4 digit places respectively. The adders $6_0$–$6_{28}$ and the carry producers $8_{0,1}$–$8_{6,7}$, $8_{8,9}$–$8_{12,13}$, $8_{14,15}$–$8_{17,18}$, $8_{19,20}$–$8_{21,22}$, $8_{23,24}$, $8_{24,25}$ and $8_{26,27}$ may all have the form shown in FIG. 3. Thus, each adder $6_i$ receives $x_i$, $\bar{x}_i$, $y_i$ and $\bar{y}_i$ as input information. In the figure, however, $x_i$ and $\bar{x}_i$, on the one hand, and $y_i$ and $\bar{y}_i$, on the other hand, are represented by a single line and arrow. If, for that matter, $\bar{x}_i$ and $\bar{y}_i$ are not available as direct informations, this information may be produced from the informations $x_i$ and $y_i$ by means of inverting gates. The adders $6_i$ produce the informations $z_i$ and $\bar{z}_i$ (the latter via an inverting gate, if required) and this is again indicated in the figure by a single line and arrow each time. The address $6_i$ also produce the indirect informations $d_i=x_iy_i$, $e_i=x_i+y_i$, $\bar{d}_i=\bar{x}_i+\bar{y}_i$, $\bar{e}_i=\bar{x}_i\bar{y}_i$. In FIGS. 4*a* and 4*b* these four items of indirect information are each represented by a single line and arrow. The section $3_3$ also comprises an input carry producer $10_3$, which as input information receives the informations $d_i$, $e_i$, $\bar{d}_i$, $\bar{e}_i$ for $i$=8, 9, 10, 11, 12, 13 and the informations $c_2=c_{7,8}$, $\bar{c}_2=\bar{c}_{7,8}$ produced by the preceding input carry producer $10_2$. From this information the input carry producer $10_3$ produces the informations $c_3=c_{13,14}$ and $\bar{c}_3=\bar{c}_{13,14}$ about the input carry of the third section. Similarly, the fourth section $3_4$ of the summation device comprises an input carry producer $10_4$, which receives the informations $d_i$, $e_i$, $\bar{d}_i$, $\bar{e}_i$ for $i$=14, 15, 16, 17, 18 and also the informations $c_3=c_{13,14}$ and $\bar{c}_3=\bar{c}_{13,14}$ produced by the input carry producer $10_3$, and from these informations, produces the input informations $c_4=c_{18,19}$, $\bar{c}_4=\bar{c}_{18,19}$. Now, from the Formulas 11, 14 and 15, it follows:

$$c_2=d_7+e_7d_6+e_7e_6d_5+\ \ldots\ e_7e_6e_5\ \ldots\ e_1d_0\quad(16)$$

$$\bar{c}_2=\bar{e}_7\bar{d}_7\bar{e}_6+\bar{d}_7\bar{d}_6\bar{e}_5+\ \ldots\ +\bar{d}_7\bar{d}_6\bar{d}_5\ \ldots\ \bar{d}_1\bar{d}_0\quad(17)$$

$$c_3=d_{13}+e_{13}d_{12}+e_{13}e_{12}d_{11}+\ \ldots\ +e_{13}e_{12}e_{11}\ \ldots\ e_1d_0\quad(18)$$

$$\bar{c}_3=\bar{e}_{13}+\bar{d}_{13}\bar{e}_{12}+\bar{d}_{13}\bar{d}_{12}\bar{e}_{11}+\ \ldots\ +\bar{d}_{13}\bar{d}_{12}\bar{d}_{11}\cdots\bar{d}_1\bar{d}_0\quad(19)$$

from which can be deduced:

$$\begin{aligned}c_3=&d_{13}+e_{13}d_{12}+e_{13}e_{12}d_{11}+e_{13}e_{12}e_{11}d_{10}+e_{13}e_{12}e_{11}e_{10}e_9\\ &+e_{13}e_{12}e_{11}e_{10}e_9d_8+e_{13}e_{12}e_{11}e_{10}e_9e_8c_2\end{aligned}\quad(20)$$

$$\begin{aligned}\bar{c}_3=&\bar{e}_{13}+\bar{d}_{13}\bar{e}_{12}+\bar{d}_{13}\bar{d}_{12}\bar{e}_{11}+\bar{d}_{13}\bar{d}_{12}\bar{d}_{11}\bar{e}_{10}+\bar{d}_{13}\bar{d}_{12}\bar{d}_{11}\bar{d}_{10}\bar{e}_9\\ &+\bar{d}_{13}\bar{d}_{12}\bar{d}_{11}\bar{d}_{10}\bar{d}_9\bar{e}_8+\bar{d}_{13}\bar{d}_{12}\bar{d}_{11}\bar{d}_{10}\bar{d}_9\bar{d}_8\bar{c}_2\end{aligned}\quad(21)$$

Analogous formulas can readily be developed for the remaining input carry producers $10_2$, $10_4$, $10_5$, $10_6$ and $10_7$. Logical circuits based on these formulas can be constructed according to known principles. In FIG. 5 this is shown with respect to the input carry producer $10_3$.

If, now, the following abbreviations are introduced:

$$\left.\begin{aligned} D_2&=d_7+e_7d_6+e_7e_6d_5+\ldots+e_7e_6e_5e_4e_3e_2e_1d_0\\ D_3&=d_{13}+e_{13}d_{12}+e_{13}e_{12}d_{11}+\ldots+e_{13}e_{12}e_{11}e_{10}e_9d_8\\ D_4&=d_{18}+e_{18}d_{17}+e_{18}e_{17}d_{16}+e_{18}e_{17}e_{16}d_{15}+e_{18}e_{17}e_{16}e_{15}d_{14}\\ D_5&=d_{22}+e_{22}d_{21}+e_{22}e_{21}d_{20}+e_{22}e_{21}e_{20}d_{19}\\ D_6&=d_{25}+e_{25}d_{24}+e_{25}e_{24}d_{23}\\ D_7&=d_{27}+e_{27}d_{26}\\ D_8&=d_{28} \end{aligned}\right\} \quad (22)$$

$$\left.\begin{aligned} E_3&=e_{13}e_{12}e_{11}e_{10}e_9e_8\\ E_4&=e_{18}e_{17}e_{16}e_{15}e_{14}\\ E_5&=e_{22}e_{21}e_{20}e_{19}\\ E_6&=e_{25}e_{24}e_{23}\\ E_7&=e_{27}e_{26}\\ E_8&=e_{28} \end{aligned}\right\} \quad (23)$$

we find $$\left.\begin{aligned} c_2&=c_{7,8}=D_2\\ c_3&=c_{13,14}=D_3+E_3c_2\\ c_4&=c_{18,19}=D_4+E_4c_3\\ c_5&=c_{22,23}=D_5+E_5c_4\\ c_6&=c_{25,26}=D_6+E_6c_5\\ c_7&=c_{27,28}=D_7+E_7c_6 \end{aligned}\right\} \quad (24)$$

But, on the other hand $$c_7=c_{27,28}=D_7+E_7D_6+E_7E_6D_5+E_7E_6E_5D_4+E_7E_6E_5E_4D_3+E_7E_6E_5E_4E_3D_2$$

However, this means that the input carries $c_2$, $c_3$, $c_4$, $c_5$, $c_6$, $c_7$ can be produced sequentially according to the Formulas 21 or 24 but that the end carry $c_7$ can also be produced simultaneously according to the Formula 25 from the information $D_i$, $E_i$ ($i=1, 2 \ldots 7$) which may also be used for the sequential production of the carriers $c_2$, $c_3$, $c_4$, $c_5$, $c_6$, $c_7$. Thus, the end carry $c_7$ can be simultaneously produced in a very fast manner without the use of an uncommonly large number of additional gates.

FIG. 6 shows the block-schematic diagram of a summation device based on the Formulas 24, 25, which is subdivided into sections $3_1$, $3_2$, $3_3$, $3_4$, $3_5$, $3_6$, $3_7$ corresponding to 8, 6, 5, 4, 3, 2, 1 digit places, respectively. The input carry producer $10_2$ of the second section receives the input information $e_0$, $d_0$, $e_1$, $d_1$, $e_2$, $d_2$, $e_3$, $d_3$, $e_4$, $d_4$, $e_5$, $d_5$, $e_6$, $d_6$, $e_7$, $d_7$, from which it produces the information $D_2=c_2=c_{7,8}$; the input carry producer $10_3$ of the third section receives the input informations $c_2=c_{7,8}$, $e_8$, $d_8$, $e_9$, $d_9$, $e_{10}$, $d_{10}$, $e_{11}$, $d_{11}$, $e_{12}$, $d_{12}$, $e_{13}$, $d_{13}$, from which is produces the informations $E_3$, $D_3$ and $c_3=c_{13,14}$; the input carry producer $10_4$ of the fourth section receives the informations $c_3=c_{13,14}$, $e_{14}$, $d_{14}$, $e_{15}$, $d_{15}$, $e_{16}$, $d_{16}$, $e_{17}$, $d_{17}$, $e_{18}$, $d_{18}$ from which it forms the information $E_4$, $D_4$ and $c_4=c_{18,19}$; the input carry producer $10_5$ of the fifth section receives the informations $c_4=c_{18,19}$, $e_{19}$, $d_{19}$, $e_{20}$, $d_{20}$, $e_{21}$, $d_{21}$, $e_{20}$, $d_{20}$, $e_{21}$, $d_{21}$, $e_{22}$, $d_{22}$ from which it forms the informations $E_5$, $D_5$ and $c_5=c_{22,23}$; the input carry producer $10_6$ of the sixth section receives the informations $c_5=c_{22,23}$, $e_{23}$, $d_{23}$, $e_{24}$, $d_{24}$, $e_{25}$, $d_{25}$ from which it forms $E_6$, $D_6$ and $c_6=c_{25,26}$; the input carry producer $10_7$ of the seventh section receives the informations $c_6=c_{25,26}$, $e_{26}$, $d_{26}$, $e_{27}$, $d_{27}$ from which it forms the informations $E_7$, $D_7$ and the end carry $c_7=c_{27,28}$. The end carry producer 11 receives the informations $D_2$, $E_3$, $D_3$, $E_4$, $D_4$, $E_5$, $D_5$, $E_6$, $D_6$, $E_7$, $D_7$ produced in the input carry producers $10_2$ to $10_7$, from which it forms the end carry $c_7=c_{27,28}$ according to Formula 25.

FIG. 7 shows the diagram of the input carry producer $10_3$ based on the Formulas 22, 23 and 24.

FIG. 8 shows the diagram of an end carry producer 11 based on the formula 25.

Since the end carry $c_{27,28}$ is produced in two different manners, that is to say sequentially by the input carry producers $10_2$ to $10_7$ and simultaneously by the end carry producer 11, the end carries produced in these two manners can be compared with one another, the computer being stopped and an alarm signal being given when the two end carries so formed are unequal.

In some cases it may be of advantage to assume that the digits of the number produced by the adder are arranged on an imaginary circle (so that the last digit place is followed by the first), the carry being produced simultaneously at one or more places.

While the invention has been described with respect to a specific embodiment, it is to be understood that this is done for illustrative purposes only, the scope of the invention being delimited in the appended claims.

What is claimed is:

1. An arithmetic element for performing in the binary system the addition of two numbers $x$ and $y$ having a plurality of orders comprising: means for applying input electrical pulses to the element, said pulses representing the binary digits $x_i$ and $y_i$ of the two numbers $x$ and $y$, where $x_i$ and $y_i$ are the binary digits at the $i^{th}$ order of $x$ and $y$, said arithmetic element being subdivided into sections, each section corresponding to a plurality of successive orders of the numbers $x$ and $y$, the number of orders in any section being one less than the number of orders in the immediately preceding section, the $k^{th}$ section comprising a first plurality of and- and or-gates, where $k$ designates any arbitrary section, said gates being responsive to said input electrical pulses to produce first auxiliary pulses representing first auxiliary information $d_i=x_iy_i$ and $e_i=x_i+y_i$, each said section further comprising a second plurality of and- and or-gates, said second plurality being responsive to said first auxiliary pulses to produce carry pulses representing carries of an addition operation and satisfying $c_{i,i+1}=d_i+e_ic_{i-1,i}$, each $k^{th}$ section except the first being preceded by an input-carry producer, means for applying to said input-carry producer the first auxiliary pulses from the $(k-1)^{th}$ section representing the first auxiliary information $d_q$, $d_{q+1} \ldots d_p$, $e_q$, $e_{q+1} \ldots e_p$, where $q$ is the order of the first and $p$ is the order of the last digit position of the $(k-1)^{th}$ section and means for applying to said input-carry producer carry pulses from the carry producer of the $(k-1)^{th}$ section representing the input carry $c_{k-1}=c_{q-1,q}$ of the $(k-1)^{th}$ section, the input carry producer of the $k^{th}$ section comprising a plurality of and-gates to the inputs of which are applied the pulses representing the first auxiliary information $d_q$, $d_{q+1} \ldots d_p$, $e_q$, $e_{q+1} \ldots e_p$, the outputs of said carry-producer gates delivering pulses representing second auxiliary information $e_pd_{p-1}$, $e_pe_{p-1}d_{p-2} \ldots$, $e_pe_{p-1} \ldots e_{q+1}d_q$, the input carry producer of the $k^{th}$ section also comprising a first or-gate connected to receive the pulses representing said second auxiliary information and delivering pulses representing the information $$D_k=e_pd_{p-1}+e_pe_{p-1}d_{p-2}+\ldots e_pe_{p-1}+\ldots+e_{q+1}d_q$$

a first further and-gate having its input connected to the outputs of the gates delivering the information $e_q$, $e_{q+1} \ldots e_p$, said and-gate delivering output pulses representing the information $E_k=e_pe_{p-1} \ldots e_{q+1}e_q$, a second further and-gate having its input connected to said first further and-gate and to the output terminal of the input carry producer of the $(k-1)^{th}$ section delivering pulses representing the information $c_{k-1}=c_{q-1,q}$, the output of said second further and-gate delivering pulses representing the information $E_kc_{k-1}$, a second or-gate the input of which is connected to the output of said second further and-gate and said first or-gate, said second or-gate delivering pulses representing the input carry $$c_k=D_k+E_kc_{k-1}$$

of said $k^{th}$ section, and an end-carry producer comprising a plurality of and-gates connected to the output terminals of the input carry producers that produce pulses representing the information $E_3$, $E_4 \ldots E_s$, $D_2$, $D_3 \ldots D_{s-1}$, the outputs of said and-gates producing pulses representing the information $E_sD_{s-1}$, $E_sE_{s-1}D_{s-2}$ . . . , $E_sE_{s-1}$ . . . $E_3D_2$, where $s$ is the number of sections, said end-carry producer further comprising an or-gate having its inputs connected to the outputs of said and-gates and to the output of the gate of the last input carry producer delivering the information $D_s$, said last-mentioned or-gate producing pulses representing the end-carry $$C_{s+1}=D_s+E_sD_{s-1}+E_sE_{s-1}D_{s-2}+ \ldots E_sE_{s-1} \ldots E_3D_2$$

2. A high-speed adder for adding pulses corresponding to the operands of plural-order binary-numbers, comprising means for registering the pulses representing the respective order operand digits of said numbers, means for applying said pulses to said adder, said adder being divided into a plurality of sections, each section having a plurality of adding elements corresponding to a plurality of successive orders of said operands, the number of orders in any section being one less than the number of orders in the immediately preceding section, each section except the one corresponding to the lowest order of said binary numbers being preceded by an input-carry producer, means in each section operating in response to a control pulse to produce sequentially the sum of the pulses applied to said section, the output of the input-carry producer of each section being coupled to the input of the lowest order adding element of said section and also to the input of the input-carry producer of the immediately succeeding section, the inputs of the input-carry producer of each section being coupled to the outputs of the individual adding elements of the immediately preceding section and the output of the input-carry producer thereof, means in each input-carry producer operating in response to said control pulse to produce simultaneously an output independent of the sequential carries of the individual adding elements in the immediately preceding section and dependent on the sequential outputs of all the preceding input-carry producers, an end-carry producer having inputs connected to the outputs of all of said input-carry producers, and means in said end-carry producer operating in response to said control pulse to produce simultaneously, independent of the intermediate carries, the carry for the highest-order digit of the sum of said plural-order binary-numbers.

References Cited in the file of this patent

UNITED STATES PATENTS 2,861,744 Schmitt et al. ____________ Nov. 25, 1958
2,879,001 Weinberger et al. _______ Mar. 24, 1959
2,966,305 Rosenberger _____________ Dec. 27, 1960